(12) United States Patent
Demirhan et al.

(10) Patent No.: US 7,760,676 B2
(45) Date of Patent: Jul. 20, 2010

(54) ADAPTIVE DRX CYCLE LENGTH BASED ON AVAILABLE BATTERY POWER

(75) Inventors: Mustafa Demirhan, Hillsboro, OR (US); Ali Taha Koc, Hillsboro, OR (US); Shweta Shrivastava, Beaverton, OR (US); Rath Vannithamby, Portland, OR (US)

(73) Assignee: Intel Corporation, Santa Clara, CA (US)

(*) Notice: Subject to any disclaimer, the term of this patent is extended or adjusted under 35 U.S.C. 154(b) by 523 days.

(21) Appl. No.: 11/752,860

(22) Filed: May 23, 2007

(65) Prior Publication Data

US 2007/0291673 A1 Dec. 20, 2007

Related U.S. Application Data

(60) Provisional application No. 60/815,293, filed on Jun. 20, 2006.

(51) Int. Cl.
*G08C 17/00* (2006.01)
*H04M 1/00* (2006.01)
(52) U.S. Cl. .................................. 370/311; 455/574
(58) Field of Classification Search ............... 370/311; 455/574
See application file for complete search history.

(56) References Cited

U.S. PATENT DOCUMENTS

| 2003/0117996 A1 | 6/2003 | Lim et al. |
| 2004/0127206 A1 | 7/2004 | Van Bosch et al. |
| 2005/0032555 A1* | 2/2005 | Jami et al. ............ 455/574 |
| 2007/0057767 A1* | 3/2007 | Sun et al. ............ 340/7.35 |
| 2007/0230394 A1* | 10/2007 | Wang et al. ............ 370/328 |

FOREIGN PATENT DOCUMENTS

| EP | 1499141 | 1/2005 |
| EP | 1499144 | 1/2005 |

OTHER PUBLICATIONS

Int'l Preliminary Report on Patentability for Int'l Application No. PCT/US2007/070986 mailed Jan. 8, 2009, Whole document.
International Application No. PCT/US2007/070986 Int'l Search Report & Written Opinion dated Nov. 19, 2007 10 pages.

* cited by examiner

*Primary Examiner*—Barry W Taylor
(74) *Attorney, Agent, or Firm*—Blakely, Sokoloff, Taylor & Zafman LLP

(57) ABSTRACT

Methods and apparatuses enable providing a dynamic, adaptive discontinuous reception (DRX) period based on available battery power of a mobile device. A mobile device can be assigned a DRX period based on a battery power level of the mobile device, and the assigned DRX period can be dynamically changed to reflect changes to the battery power level. In one embodiment, the mobile device initiates changes to the DRX period.

13 Claims, 3 Drawing Sheets

ADAPTIVE DRX CYCLE LENGTH BASED ON AVAILABLE BATTERY POWER

This U.S. Application claims priority to U.S. Provisional Application 60/815,293 filed Jun. 20, 2006.

FIELD

Embodiments of the invention relate to power control in wireless devices, and more particularly to providing an adaptive-length discontinuous reception period based on available battery power in the wireless device.

BACKGROUND

When a mobile (wireless) device connects to a network, the mobile device and the network negotiate the connection details. In some systems, a mobile device will enter a "sleep" state and wake periodically to "listen" for paging messages, or be in an active state when a paging message can be received. When sleep states are used, part of the negotiation of the mobile device with the network may be to determine and set a sleep period, or a period of inactivity. Thus, the network knows when the mobile device will be expecting paging signals, and can transmit paging signals during a period of time when the mobile device will be listening for such paging signals.

In current systems, the sleep period negotiated between the mobile device and the network is fixed. The sleep period may be set according to a profile set up on the mobile device, and may be different for different types of devices, etc. However, generally, once the sleep period is set by the network, the period is fixed. Note that a sleep period that is too long may result in unnecessary or even unacceptable levels of delay in receiving a paging signal. On the other hand, a sleep period that is too short may significantly reduce the operating life of the device between recharges (i.e., by depleting battery power by waking up too frequently).

BRIEF DESCRIPTION OF THE DRAWINGS

The following description includes discussion of figures having illustrations given by way of example of implementations of embodiments of the invention. The drawings should be understood by way of example, and not by way of limitation.

DETAILED DESCRIPTION

Figure 1:
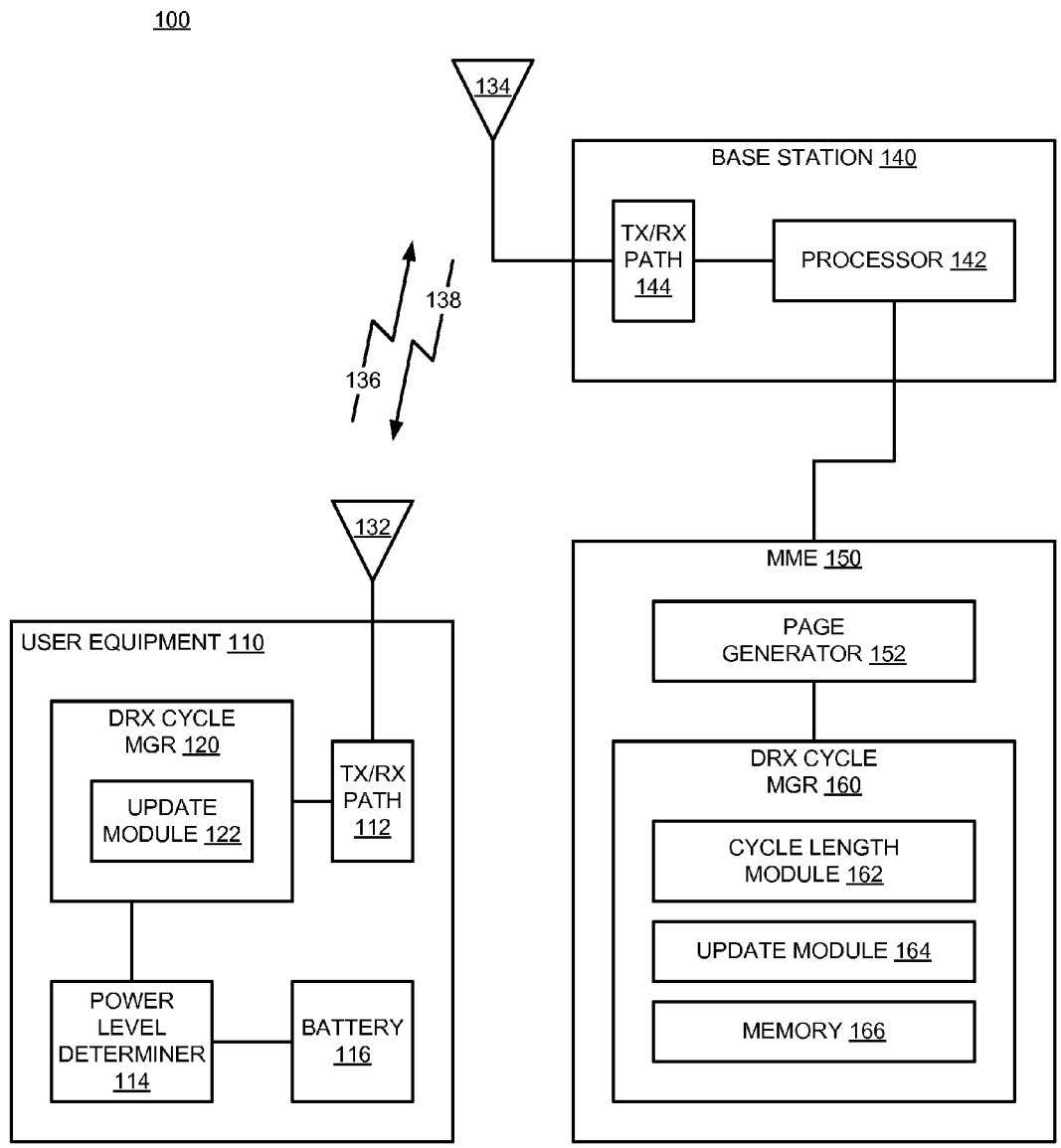
FIG. 1 is a block diagram of an embodiment of a system having user equipment and a base station that negotiate an adaptive-length discontinuous reception period.

As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

An adaptive discontinuous reception (DRX) period is provided to allow for longer or shorter DRX periods based on available battery power in a mobile device. Thus, a system can allow for adaptive trade-off between shorter DRX periods that avoid paging delays, or longer DRX periods that increase paging delays but conserve power in the mobile device. Rather than being fixed, the DRX period can be dynamically set. The DRX period can be dynamically adjusted while the mobile device is connected to the network. In one embodiment, the mobile device initiates adaptation of the DRX period.

Minimizing power consumption is an important factor in the design of mobile (wireless) equipment for longer battery life. In system implementation consistent with or compatible with a 3GPP specification, power consumption can be minimized by use of an IDLE mode, in which a UE (user equipment) enters a "sleep" state when there is little or no activity in the UE for a pre-specified period of time, or until the UE is activated by a user. As used herein, a 3GPP specification refers to any of a number of specifications, including GSM (Global System for Mobile Communications) and W-CDMA (Wideband Code Division Multiple Access) specifications, as adopted, proposed, or propagated by the 3rd Generation Partnership Project (3GPP). As used herein, UE refers to any type of wireless or mobile devices that connect with a network. During the IDLE mode, there can be an incoming call intended for the UE. The network notifies the UE of an incoming call by sending a paging message. In order to be able to receive paging messages in the IDLE mode, the UE employs the DRX mechanism, in which the UE wakes up periodically to receive the paging message. With DRX as defined in the 3GPP standard, the UE only needs to monitor one page indicator (PI) in one paging occasion per DRX cycle. As used herein, DRX cycle length and DRX period refer to the length of time the UE is in sleep mode. Thus, the DRX cycle length refers to the period of time from one wake state to another.

Traditionally, the network is responsible for assigning the DRX cycle length to the UE, which remains constant as long as the UE is connected to a particular base station. Thus, the network has knowledge about the DRX cycle length of a particular UE. With such knowledge, the network can send a paging message to the UE during the period of activity, and connect with the UE. As used herein, "network" refers to one or more devices on the server side (as opposed to the client side represented by the UE). Such devices may include a base station (which may also be referred to as an eNodeB), an MME (mobile management entity) or equivalent, as well as other management and connection equipment. The network may typically include wired or land-based connections to a communications backbone, with associated routing/switching equipment, etc. The description herein focuses mainly on the UE and its interaction with the base station and MME (collectively, "the network").

The design of the DRX cycle length faces a trade-off between two competing considerations: 1) reduced power consumption at the UE; and, 2) short delay in receiving a paging message at the UE. A long DRX cycle length achieves low power consumption because the UE stays asleep for longer periods. However, a long DRX cycle length increases the delay in receiving the paging message. A shorter DRX cycle length reduces delay in receiving paging messages, but increases the power consumption of the UE as the UE engages in receiving activity more frequently. Thus, the consideration of DRX cycle length can significantly influence the power consumption and reception performance at the UE.

The balance between paging message reception delay and power consumption at the UE can be improved with respect to traditional systems if: 1) the UE can make or influence the decision about the DRX cycle length based on remaining battery life, and potentially other factors; and, 2) the DRX cycle length can vary dynamically (instead of being set only at initialization of the UE) based on changing conditions.

In one embodiment, a UE-assisted adaptive DRX cycle length based on the available battery power level of the UE is provided. The UE can indicate a battery power level to the network and/or determine a DRX cycle length and request the network to set the determined DRX cycle length. The DRX cycle length or DRX period can be dynamically changed based on changing conditions at the UE (e.g., increasing or depleting battery power).

Thus, with an adaptive DRX cycle length, a UE that has low battery power might have a long DRX cycle length, thus reducing its power consumption. The UE can dynamically negotiate the DRX cycle length with the network (e.g., via a base station with which the UE interfaces). Similarly, if the UE battery is recharged, the DRX cycle length can be adjusted in response to the increased power level. Also, if an initial, relatively short DRX cycle length is set for a UE, the cycle length can be increased as the battery power decreases from one level to another.

In one embodiment, the DRX cycle length will be set (initial assignment) and adaptively changed based on the available power on the UE. The initial assignment can be performed according to any previously known technique for determining and setting DRX cycle length. In one embodiment, the initial assignment can be based on information provided to the network when the UE initially negotiates with the network (e.g., at startup, or during re-negotiation if the UE changes to a different tracking area or is handed off to a different base station).

The DRX cycle length can be configured for any of a number of different implementations. In one embodiment, the adaptive DRX cycle length allows multiple (two or more) values of DRX cycle length based on a given threshold. For example, there may be a single battery power level threshold (e.g., 50% or 25% battery life), upon which the DRX cycle length is changed from a "normal" or standard length to a "power-conservation" length. A more fine tuned control over UE power consumption can be achieved by having more stages of DRX cycle length based on varying levels of battery power at the UE. For example, the system could be configured with different DRX cycle length settings for battery power levels of greater than 75%, between 50 and 74%, between 25 and 49%, and lower than 25%. Other implementations are possible. Alternatively, the DRX cycle length could be dynamically calculated based on battery power level on a periodic or aperiodic basis. Thus, the mapping between the battery power level thresholds and the DRX cycle length can be implemented either as a simple table lookup or as advanced algorithm taking into account battery power level and one or more other factors. One possible example of other factors that could be considered may be a profile of the UE. Additionally, a user of the UE may be able to set a DRX period, or switch on/off a dynamic DRX cycle length feature.

In one embodiment, the process of varying the DRX cycle length is initiated by the UE. For example, when the battery power level of the UE falls below a given threshold value, the UE sends a message to the network indicating an increased DRX cycle length. The UE can simply indicate to the network that a next-lower threshold has been reached, or indicate more specific information, such as the battery power threshold reached, an actual battery power level, etc. In one embodiment, the UE can identify a DRX cycle length internally via a lookup table, or via a computation, and indicate the desired DRX cycle length to the network. Note that such an implementation would require UE processing, which would partially defeat the intended purpose of conserving UE battery power.

Similarly, when the battery power level increases above a particular threshold value (e.g., when the UE battery is recharged), the UE can negotiate with the network to reduce the DRX cycle length. The mechanisms described above would apply equally well in negotiating a reduced DRX cycle length as negotiating an increased DRX cycle length. Thus, the UE can indicate a specific battery power level, indicate the reaching of a (higher) threshold, etc.

Upon receiving the message from the UE, the network might decide to accept the new DRX cycle length for the UE, or might reject the request and assign a different value. In one embodiment, the network receives a requested cycle length from the UE. In another embodiment, the network receives an indication of the UE battery power level, and the network can determine what DRX cycle length to assign based on the indicated battery power level. In another embodiment, the UE indicates a battery power level threshold has been reached, either a specific threshold or a next-higher/lower, and the network determines what DRX cycle length to assign based on the threshold reached (i.e., as compared to a previous threshold that the UE was at). The network informs the UE of the determined DRX cycle length.

FIG. 1 is a block diagram of an embodiment of a system having user equipment and a base station that negotiate an adaptive-length discontinuous reception period. System 100 includes user equipment (UE) 110, base station 140, and MME (mobile management entity) 150. UE 110 represents any type of mobile wireless device, for example, a mobile phone or wireless device with phone capability. Base station 140 represents an access point to a wireless network system to which UE 110 belongs. MME 150 represents a management entity that connects to multiple base stations, and has information about UEs in the network. Base station 140 and MME 150 will be collectively referred to as "the network."

UE 110 includes battery 116, which provides power to the UE. Power level determiner 114 represents a circuit and/or processor that determines a power level or remaining battery life of battery 116. In one embodiment, power level determiner 114 is coupled to a processor of UE 110, which can transmit the power level information to MME 150 via base station 140. In one embodiment, UE 110 includes DRX cycle manager (mgr) 120, which manages DRX cycle information for UE 110. DRX cycle manager 120 may be a standalone module, or a module separate from a main processor of UE 110, or it may be part of a main processor or baseband processor of UE 110. DRX cycle manager 120 receives information from power level determiner 114, which it may send to the network, or which it may use to determine what information to send to the network.

In one embodiment, DRX cycle manager 120 determines a DRX cycle length based on the determined power level. DRX cycle manager 120 may also, or alternatively, determine a power level threshold of the battery power, which can inform a decision on DRX cycle length. DRX cycle manager 120 may include update module 122, which represents functional components, whether software or hardware or a combination, to enable DRX cycle manager 120 to obtain and send DRX cycle length information. Update module 122 can include a scheduler to periodically obtain power level information from power level determiner 114 (which in one embodiment may be part of DRX cycle manager 120) at certain times. The obtained information can be sent to the network if DRX cycle manager 120 determines that a different cycle length should be used. In one embodiment, update module 122 obtains power level information in response to a request from the network. The network may request such information at startup of UE 110, or at some other period of negotiation. TX/RX path 112 represents signal lines, converters, amplifiers, etc., used to transmit and/or receive a wireless signal. TX/RX path 112 is coupled to antenna 132, via which UE 110 communicates with base station 140.

Signal 136 represents an uplink communication from UE 110 to base station 140, and signal 138 represents a downlink communication from base station 140 to UE 110. Base station 140 includes antenna 134, which is connected to TX/RX path 144, which provides the ability of base station 140 to transmit and receive signals. Base station 140 includes processor 142, with which base station can process transmit and/or receive signals. Note that in a practical implementation, processor 142 may represent one or more separate processors for downlink communication, as well as one or more processors for uplink communication. Processor 142 is configured to be responsive to messages regarding a DRX cycle length of UE 110. Thus, UE 110 can send DRX cycle length information that base station 140 provides to MME 150, and MME 150 can provide DRX cycle length information for UE 110 that base station 140 provides to UE 110. Typically, the processing of such information and the determination of what DRX cycle length to assign to UE 110 is handled by MME 150.

MME 150 includes page generator 152, which generates paging messages to be sent to UE 110. Such messages are provided to base station 140, which transmits the signal. Page generator 152 is coupled to DRX cycle manager 160, which provides network-side functionality for DRX cycle length determination and assignment. Pages are generated for UE 110 according to the cycle length assigned to UE 110. DRX cycle manager 160 may include one or more components, including, cycle length module 162, update module 164, and memory 166.

Cycle length module 162 enables MME 150 to identify a cycle length for UE 110, which may be persisted in memory 166, which may represent volatile and/or non-volatile memory resources. In one embodiment, cycle length module 162 includes a lookup table to determine what battery power level corresponds to what DRX cycle length. Update module 164 enables MME 150 to dynamically engage in DRX cycle length negotiations with UE 110. Thus, the DRX cycle length assignment can be dynamically changed. In one embodiment, the changes to the DRX cycle length are made in response to information provided by UE 110, such as an indication of a threshold power level being reached, or an indication of remaining battery power.

Various components described herein may be a means for performing the functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Software content (e.g., data, instructions, configuration) may be provided via an article of manufacture including a machine readable medium, which provides content that represents instructions that can be executed. The content may result in a machine performing various functions/operations described herein. A machine readable medium includes any mechanism that provides (i.e., stores and/or transmits) information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A machine readable medium may also include a storage or database from which content can be downloaded. A machine readable medium may also include a device or product having content stored thereon at a time of sale or delivery. Thus, delivering a device with stored content, or offering content for download over a communication medium may be understood as providing an article of manufacture with such content described herein.

Figure 2:
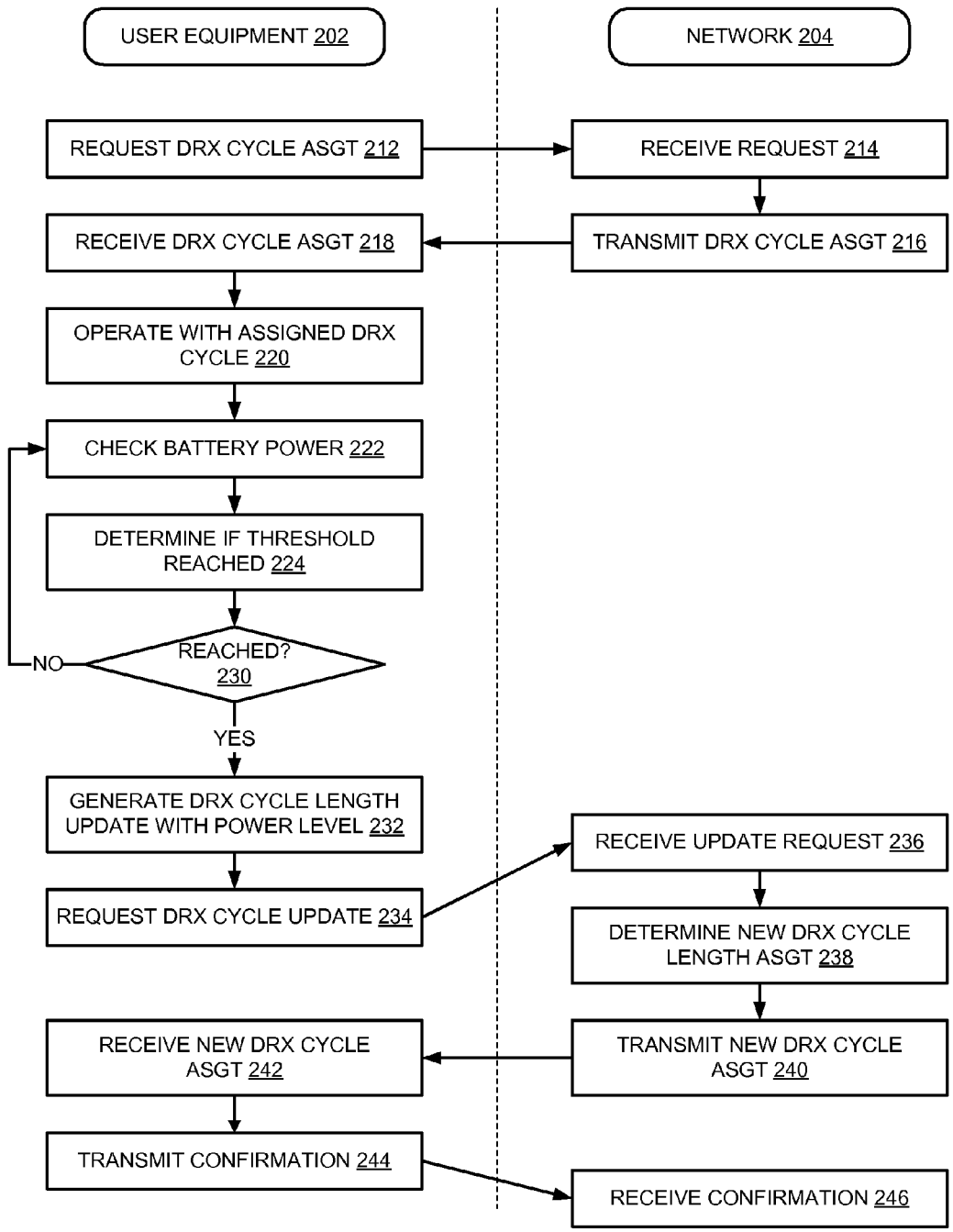
FIG. 2 is a flow diagram of an embodiment of a process for providing an adaptive-length discontinuous reception period.

FIG. 2 is a flow diagram of an embodiment of a process for providing an adaptive-length discontinuous reception period. Flow diagrams as illustrated herein provide examples of sequences of various process actions. Although shown in a particular sequence or order, unless otherwise specified, the order of the actions can be modified. Thus, the illustrated implementations should be understood only as examples, and the processes can be performed in a different order, and some actions may be performed in parallel. Additionally, one or more actions can be omitted in various embodiments of the invention; thus, not all actions are required in every implementation. Other process flows are possible.

User equipment (UE) 202 represents a mobile device according to any embodiment described herein. Network 204 represents one or more components of a wireless communications network, which may include a base station and an MME. UE 202 requests a DRX cycle assignment, 212. Such a request can be made at initial negotiations with a base station, or in response to the UE determining that a battery power level threshold has been reached. Network 204 receives the DRX cycle request, 214. Note that the actual message is typically received at a base station, processed, and forwarded on to the MME for further processing (e.g., determining what response to make to the request). The network determines a DRX cycle to assign to the UE, and transmits the DRX cycle assignment to the UE, 216.

UE 202 receives the DRX cycle assignment, 218, and configures itself according to the assignment. The UE then operates according to the assigned DRX cycle, 220. The DRX cycle length can be monitored to make sure that the UE is operating under the best DRX cycle length assignment for a given battery power level of the UE. Thus, the UE may monitor the battery and periodically check the battery power, 222. In one embodiment, UE 202 determines whether a threshold battery power level is reached, 224. Note that in one implementation, the UE would simply transmit such information to network 204. Determining whether a threshold is reach can be performed via a lookup table, or via computation of an algorithm. If a threshold is not reached, 230, the UE continues to monitor the battery power level, 222.

If the threshold is reached, 230, the UE can generate a DRX cycle length update based on the power level, 232. A DRX cycle update request can then be sent to the network, 234. Note that such a DRX cycle update request may be sent with or without power level information, and may simply indicate that the threshold has been reached. The UE can request a specific DRX cycle length based on the power level, or simply request an adjustment, which is provided by the network.

The network receives the update request, 236, and determines a new DRX cycle length assignment based on the request, 238. Determining the new DRX cycle length assignment can refer to accepting a proposed length assignment requested by the UE, identifying a DRX cycle length assignment via lookup, computing an algorithm to determine the DRX cycle length assignment, etc. In one embodiment, the request will be denied, and the "new" length assignment will be the previous cycle length assignment. In one embodiment, an updated cycle length assignment can be provided "relatively" to the previous cycle length assignment. That is, rather than sending a specific length to the UE, the network may provide a delta, or an adjustment amount by which the UE can adjust its cycle length (which may be a positive or negative number, or may be an absolute value with an up/down indicator). The network transmits the new DRX cycle length assignment to the UE, 240.

UE 202 receives the new DRX cycle length assignment, 242, and implements the assignment. The UE can then confirm receipt of the cycle length assignment by transmitting a confirmation message, 244. When the network receives the confirmation message, 246, both the UE and the network are synchronized as to what DRX cycle length is being utilized by the UE.

Figure 3:
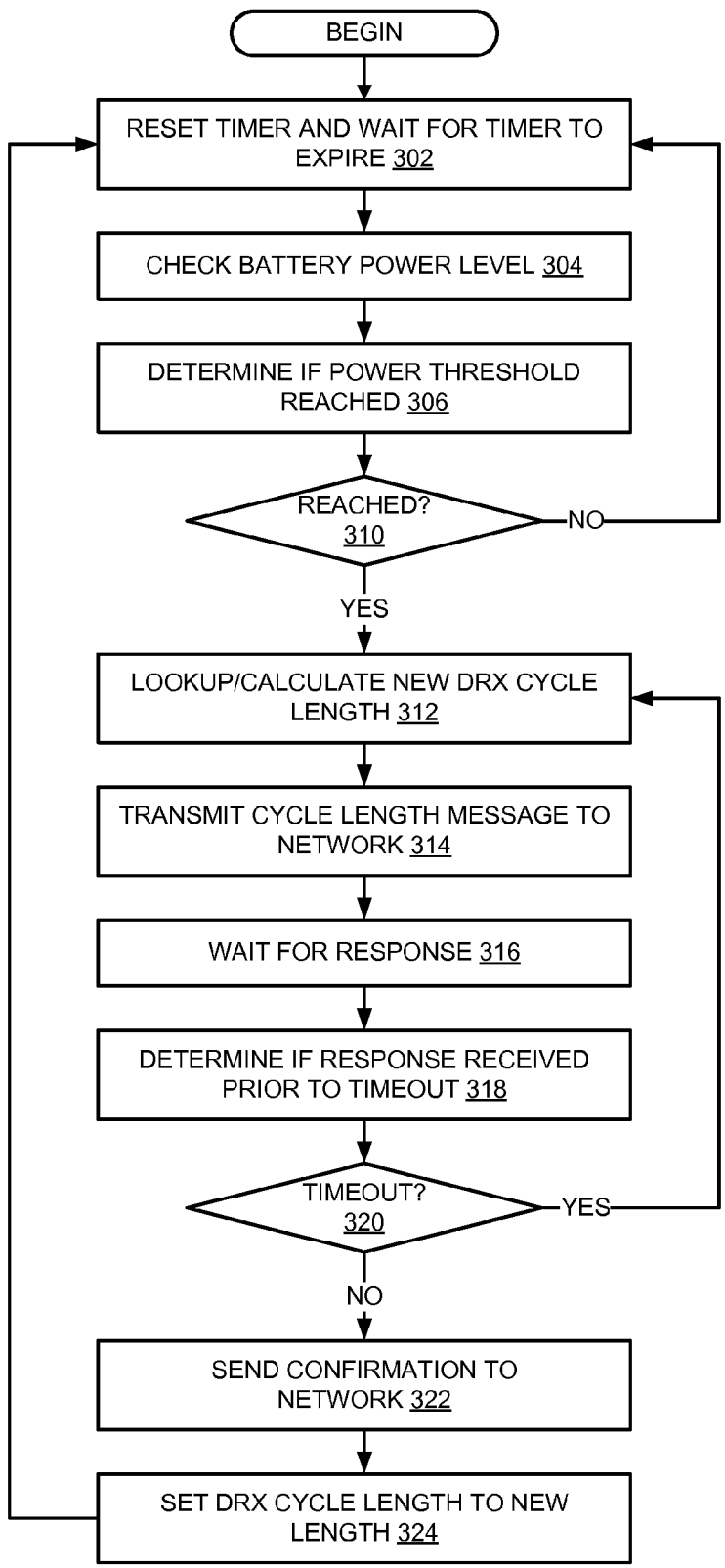
FIG. 3 is a flow diagram of an embodiment of a process for selecting a discontinuous reception period length.

FIG. 3 is a flow diagram of an embodiment of a process for selecting a discontinuous reception period length. Such a process as described below considers a periodic battery power level check. A timer within the UE is reset and begins to run until an expiration is reached. The UE waits for the timer to expire, 302. A battery power level detection circuit checks the battery power level in response to the expiration of the timer, 304. The information gathered by the detection circuit in the detection routine is sent to a processing module, either within the detection circuit, or some other module coupled to the detection circuit. The processing module determines if a power threshold has been reached, 306. One or more power thresholds may be configured into the processing module of the UE to enable it to make such a determination. If a threshold has not been reached, 310, the timer is reset, and the detection circuit waits until the next detection period, 302.

If a battery power threshold has been reached, 310, a processing module determines a new DRX cycle length to use, based on the battery power level, 312. Such a determination can be made via lookup or calculation. In one embodiment, such actions are performed by the network in response to a notification sent by the UE. The UE transmits a cycle length updated message to the network, 314, which may request a specific assignment, if calculated, or request a new assignment as determined by the network.

The UE awaits a response from the network, 316. In one embodiment, the UE has a timeout period on communication with the network, and the UE can determine if a response is received by the network prior to timeout, 318. If the timeout is reached, 320, the UE may recalculate and/or retransmit the request for an updated DRX cycle length. Otherwise, a response is received prior to timeout, 320, and the UE sends a confirmation of reception of the DRX cycle length assignment from the network, 322. The UE can then set the DRX cycle length to the assigned updated value, 324, and continue monitoring battery power, 302.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
   determining with a battery power detection circuit that a battery power threshold of a mobile device has been reached; and
   adjusting a length of a discontinuous reception (DRX) period for the mobile device based on determining that the battery power threshold has been reached, wherein adjusting the length of the DRX period includes
      identifying, with a processor of the mobile device, a length adjustment based on reaching the battery power threshold; and
      sending a message to a base station indicating the identified length.

2. The method of claim 1, wherein the threshold comprises a battery power threshold indicating a level of higher power, and adjusting the length comprises:
   shortening the length of the DRX period.

3. The method of claim 1, wherein the threshold comprises a battery power threshold indicating a level of lower power, and wherein adjusting the length comprises:
   increasing the length of the DRX period.

4. The method of claim 1, wherein identifying the length adjustment comprises:
   identifying the length adjustment from a lookup table.

5. The method of claim 1, wherein identifying the length adjustment comprises:
   computing the length adjustment based on the determined power level.

6. The method of claim 1, wherein adjusting the length of the DRX period comprises:
   sending an indication to a base station that the battery power threshold has been reached; and
   receiving an new DRX period assignment from the base station in response to sending the indication.

7. An article of manufacture comprising a non-transitory computer readable medium having content stored thereon to provide instructions to cause a machine to perform operations, including:
   determining that a battery power threshold of a mobile device has been reached; and
   adjusting a length of a discontinuous reception (DRX) cycle for the mobile device based on determining that the battery power threshold has been reached, wherein adjusting the length of the DRX cycle length includes
      identifying a new cycle length based on reaching the battery power threshold; and
      sending a message to a base station indicating the identified cycle length.

8. The article of manufacture of claim 7, wherein the content to provide instructions for identifying the new cycle length comprises:
   identifying the new cycle length from a lookup table.

9. The article of manufacture of claim 7, wherein the content to provide instructions for identifying the new cycle length comprises:
   computing the new cycle length based on the determined power level.

10. A user device comprising:
   a power level module to identify a battery power level of the user device;
   a discontinuous reception (DRX) cycle management module coupled to the power level module to generate a request for an updated DRX cycle length assignment, based on the identified battery power level, wherein the DRX cycle management module further determines a proposed DRX cycle length assignment based on the identified battery power level and generates the request indicating the proposed DRX cycle length assignment; and a transceiver coupled to the DRX cycle management module to transmit the request to a network access point.

11. The user device of claim 10, wherein the DRX cycle management module generates a request indicating the identified battery power level.

12. The user device of claim 10, wherein the DRX cycle management module generates a request indicating that a battery power level threshold has been reached.

13. The user device of claim 10, wherein the transceiver further receives an updated DRX cycle length assignment from the network access point, and the DRX cycle management module further implements the updated cycle length assignment, and generates a confirmation message that is transmitted to the network access point.

* * * * *